May 5, 1925.  1,536,286
L. DE FLOREZ
ATTACHMENT FOR SEXTANTS
Filed March 21, 1919
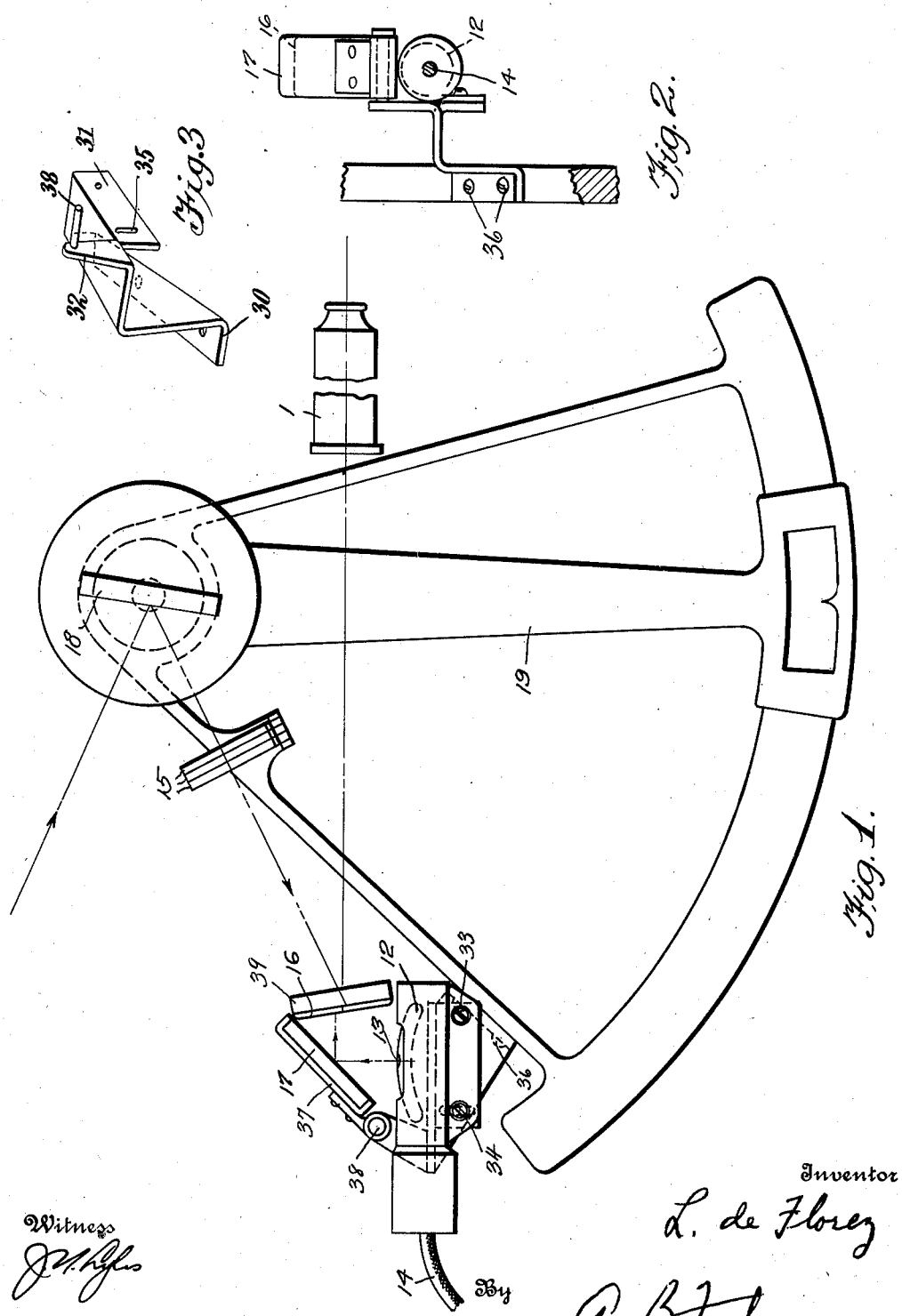

Patented May 5, 1925.

1,536,286

UNITED STATES PATENT OFFICE.

LUIS DE FLOREZ, OF SHORT HILLS, NEW JERSEY.

ATTACHMENT FOR SEXTANTS.

Application filed March 21, 1919. Serial No. 284,025.

*To all whom it may concern:*

Be it known that I, LUIS DE FLOREZ, a citizen of the United States, residing at Short Hills, in the State of New Jersey, have invented certain new and useful Improvements in Attachments for Sextants, of which the following is a specification.

My present invention relates to a sextant attachment, and has for its object to provide a sextant device whereby it is unnecessary to depend upon the use of the actual horizon, the same not always being accessible, and whereby the bubble of a spirit level is substituted for the horizon, by means of which great accuracy in the readings is possible.

In determining position by the use of a sextant, it is necessary to know the angular distance of the sun or other celestial body above the horizon, assuming that the horizon and the eye of the person applying the test are on the same level. If a person ascends a considerable distance in an airship, the horizon, even if visible, is at a considerable distance below him. Frequently whether a person is on an airship or on land or on ship-board, the horizon is not visible, or is only indistinctly visible, and under these circumstances a substitute for the horizon is advantageous.

According to my present invention, I employ the bubble of a spirit level as the equivalent of the horizon, an image of said bubble and an image of the sun being reflected by suitable means into a common field of vision, and brought to the same level by adjusting the sextant, and the reading then being taken in the well known manner.

By my invention it is not necessary to use either the actual horizon, or the "artificial horizon" heretofore commonly used, viz a dish of mercury, but the bubble of the spirit level and the sun (or some other heavenly body) furnish the two points needed.

In the drawing, Fig. 1 shows an elevation of a device falling within the scope of the present invention. Fig. 2 is an end view of the same device (parts being omitted for clarity). Fig. 3 is a perspective view of a bracket for holding the spirit level, horizon glass, reflecting mirror, etc.

In said drawings, the sextant proper is of any of the well known kinds, preferably provided with any suitable telescope 1 rigidly attached to the sextant. A peep hole can sometimes be substituted for this.

Mounted on the far end of the sextant, by a suitable bracket, is a suitable bubble glass or spirit level 12, of which the bubble comes into position 13, when the instrument is level. This may be illuminated by a suitable electric light for night work, current being supplied by wires 14. 15 shows suitable colored glasses to prevent the glare due to the direct sun's reflection. 16 is the usual half-silvered horizon glass upon which the sun is reflected by the mirror 18 of the sextant itself, and through which the bubble is seen in the mirror 17, placed at a suitable angle, say 45°.

Where the bracket is separable from the sextant frame or forms part of an attachment to the ordinary sextant, it may comprise a frame engaging portion 30 attachable to the frame by means of screws 36 adapted to support a level carrying flange 31 and a mirror supporting flange 32, said flanges being preferably formed by bending adjacent portions of the bracket forming material in opposite directions. The level 12 may be secured to the flange 31 by means of a bolt 33 passing through a corresponding aperture in the flange. Another bolt 34 engages a slot 35 in the flange, thus permitting adjustment of the level. The mirror 17 may be mounted in a suitable support or frame 37 which is hinged to the flange 32 by means of the pin 38, said frame 37 also being adapted to support a frame 39 for the horizon glass 16.

Holding the entire device in one hand, it is easy by moving the lever 19 forwards or backwards with the other hand to get the sun's reflection and that of the bubble in the required position relative to each other (usually on the same level) on the horizon glass, whereupon the reading of the angle of the sun with respect to the horizontal is made and the position is calculated. I call attention to the fact that in the preferred operation, the image of the bubble and that of the sun can be made to coincide, thus making the reading very accurate and thereby eliminating certain astronomical corrections usually necessary.

In this invention, the mirror for reflecting the bubble is on the far side of the horizon glass, whereby any desired kind of telescope can be conveniently used, and great accuracy is secured. This relative arrangement of the parts permits the establishing of an artificial horizon by means of a fluid level located at the maximum practical distance from the eye of the observer, thus permitting a high degree of accuracy in the reading of the instrument.

While it is preferred to locate the spirit level on the far side of the horizon glass, good results can be secured when the spirit level is located between the horizon glass and the far end of the sighting device. The sighting device is ordinarily a telescope, although not necessarily so.

The adjustment of the instrument is such that setting the arm at zero on the scale and sighting the horizon or its equivalent, the bubble will be at the position 13.

What I claim is:

1. An attachment for a sextant including a detachable bracket adapted to engage a sextant frame and having an upwardly extending level supporting flange and a downwardly extending mirror supporting flange lying in the same plane, a downwardly extending and offset leg carrying an attaching flange lying in a different plane from the other two flanges.

2. An attachment for a sextant including a detachable bracket having a flanged engagement with a sextant frame, a second flange on said bracket adapted to movably mount a bubble glass and illuminating means for the bubble and a third flange on said bracket adapted to pivotally mount a mirror and a horizon glass.

In testimony whereof I affix my signature.

LUIS de FLOREZ.